US008613886B2

(12) United States Patent
Qiao et al.

(10) Patent No.: US 8,613,886 B2
(45) Date of Patent: Dec. 24, 2013

(54) NICKEL-RICH WEAR RESISTANT ALLOY AND METHOD OF MAKING AND USE THEREOF

(75) Inventors: Cong Yue Qiao, Menominee, MI (US); Todd Trudeau, Menominee, MI (US)

(73) Assignee: L. E. Jones Company, Menominee, MI (US)

( * ) Notice: Subject to any disclaimer, the term of this patent is extended or adjusted under 35 U.S.C. 154(b) by 2220 days.

(21) Appl. No.: 11/476,550

(22) Filed: Jun. 29, 2006

(65) Prior Publication Data

US 2008/0001115 A1    Jan. 3, 2008

(51) Int. Cl.
*C22C 19/05* (2006.01)
*F16K 1/42* (2006.01)

(52) U.S. Cl.
USPC ............ 420/442; 251/359; 251/368; 428/544

(58) Field of Classification Search
USPC .................... 420/442; 251/359, 368; 428/544
See application file for complete search history.

(56) References Cited

U.S. PATENT DOCUMENTS

| | | |
|---|---|---|
| 1,911,173 A | 5/1933 | Colwell |
| 2,753,858 A | 7/1956 | Honeyman et al. |
| 3,167,424 A | 1/1965 | Wick |
| 3,203,792 A | 8/1965 | Scheil et al. |
| 3,853,545 A | 12/1974 | Kusaka et al. |
| 4,006,015 A | 2/1977 | Watanabe et al. |
| 4,228,223 A | 10/1980 | Knotek et al. |
| 4,299,629 A | 11/1981 | Haack |
| 4,346,684 A | 8/1982 | Vossieck |
| 4,363,660 A | 12/1982 | Wakita et al. |
| 4,430,297 A | 2/1984 | Crook |
| 4,810,466 A | 3/1989 | Choi et al. |
| 4,822,695 A | 4/1989 | Larson et al. |

(Continued)

FOREIGN PATENT DOCUMENTS

| | | |
|---|---|---|
| EP | 499969 A1 | 8/1992 |
| EP | 693565 A2 | 1/1996 |

(Continued)

OTHER PUBLICATIONS

International Preliminary Report on Patentability issued Jan. 6, 2009 for PCT/US2007/014840.

(Continued)

*Primary Examiner* — Rebecca Lee
(74) *Attorney, Agent, or Firm* — Buchanan Ingersoll & Rooney PC (57) ABSTRACT

A nickel-rich wear resistant alloy comprises in weight % 0.5 to 2.5% C, 0.5 to 2% Si, up to 1% Mn, 20 to 30% Cr, S to 15% Mo, 5 to 15% W, 15 to 30% Fe, balance Ni. The alloy can include further alloying constituents such as up to 1.5% each of Ti, Al, Zr, Hf, Ta, V, Nb, Co, Cu, up to 0.5% B and up to 0.5% Mg plus Y. The alloy preferably has a microstructure containing predominantly eutectic reaction phases, fine intermetallic phases and precipitation carbides. For instance, the microstructure may contain Cr. Ni, W rich intermetallic phases and/or the microstructure may contain uniform lamellar type eutectic solidification structures. The alloy is useful as a valve seat insert for internal combustion engines such as diesel engines. For a valve seat insert containing up to 1.8% C the microstructure preferably is free of primary dendritic carbides. For a valve seat insert alloy containing over 1.8% C the microstructure preferably contains non-dendritic type primary carbides. For a valve seat insert containing up to 1.5% C the microstructure preferably includes solid solution phases encompassed by eutectic reaction products.

16 Claims, 4 Drawing Sheets

(56) References Cited

U.S. PATENT DOCUMENTS

| | | |
|---|---|---|
| 4,911,768 A | 3/1990 | Dong et al. |
| 4,929,419 A | 5/1990 | Wegman et al. |
| 5,141,704 A | 8/1992 | Kondo et al. |
| 5,246,661 A | 9/1993 | Culling |
| 5,419,869 A | 5/1995 | Choi et al. |
| 5,674,449 A | 10/1997 | Liang et al. |
| 5,958,332 A | 9/1999 | Hoeg |
| 6,200,688 B1 | 3/2001 | Liang et al. |
| 6,436,338 B1 | 8/2002 | Qiao |
| 6,482,275 B1 | 11/2002 | Qiao |
| 6,544,362 B2 | 4/2003 | Pike, Jr. et al. |
| 6,638,373 B2 | 10/2003 | Pike, Jr. et al. |
| 6,702,905 B1 | 3/2004 | Qiao et al. |
| 6,761,777 B1 | 7/2004 | Radon |
| 6,860,948 B1 | 3/2005 | Pike, Jr. |
| 6,881,280 B2 | 4/2005 | Qiao |
| 2002/0020384 A1 | 2/2002 | Hoeg |
| 2004/0258554 A1 | 12/2004 | Radon |
| 2005/0006006 A1 | 1/2005 | Schall |

FOREIGN PATENT DOCUMENTS

| | | |
|---|---|---|
| GB | 558182 | 12/1943 |
| GB | 1263925 | 2/1972 |
| GB | 1428686 | 3/1976 |
| GB | 2336599 A | 10/1999 |
| JP | 58117847 A | 7/1983 |
| JP | 60-46896 A | 3/1985 |
| JP | 09-209095 A | 8/1997 |
| JP | 10-204563 A | 8/1998 |
| WO | WO 99/39015 A1 | 8/1999 |

OTHER PUBLICATIONS

Yao, X.X. et al., "The Microstructural Characteristics in a Newly-Developed Nickel-base Cast Superalloy," Materials Characterization, 1997, pp. 97-102, vol. 38.

International Search Report and Written Opinion dated Dec. 6, 2007 for PCT/US07/14840.

Supplementary European Search Report dated Aug. 25, 2009 for EP07796464.1-2122.

Chinese Official Action dated Feb. 12, 2010 for Chinese Patent Appln. No. 200780027267.8.

NICKEL-RICH WEAR RESISTANT ALLOY AND METHOD OF MAKING AND USE THEREOF

BACKGROUND

The invention relates to nickel-rich alloys having hardness and wear resistance properties suitable for use in engine parts such as valve seat inserts.

Engine operating conditions in internal combustion engines such as diesel engines are placing ever increasing demands on materials used for valve seat inserts. As a result, there is a need for improved valve seat insert materials.

SUMMARY

According to a preferred embodiment, a nickel-rich wear resistant alloy comprises in weight % 0.5 to 2.5% C, 0.5 to 2% Si, up to 1% Mn, 20 to 30% Cr, 5 to 15% Mo, 5 to 15% W, 15 to 30% Fe, balance Ni.

The alloy can include further alloying constituents such as up to 1.5% each of Ti, Al, Zr, Hf, Ta, V, Nb, Co and Cu, up to 0.5% B and/or up to 0.5% Mg plus Y.

The alloy preferably has a microstructure containing predominantly eutectic reaction phases, fine intermetallic phases and precipitation carbides. For instance, the microstructure may contain Cr. Ni, W rich intermetallic phases and/or the microstructure may contain uniform lamellar type eutectic solidification structures. The alloy is useful as a valve seat insert for internal combustion engines such as diesel engines.

For a valve seat insert containing up to 1.8% C the microstructure preferably is free of primary dendritic carbides. For a valve seat insert alloy containing over 1.8% C the microstructure preferably contains non-dendritic type primary carbides. For a valve seat insert containing up to 1.5% C the microstructure preferably includes solid solution phases encompassed by eutectic reaction products.

According to another embodiment, a valve seat insert comprises in weight % 0.5 to 2.5% C, 0.5 to 2% Si, up to 1% Mn, 20 to 30% Cr, 5 to 15% Mo, 5 to 15% Cr, 15 to 30% Fe, balance Ni. The valve seat can be manufactured by casting and have an as cast hardness of at least about 40 Rockwell C, a compressive yield strength at room temperature of 95 ksi, and/or a compressive yield strength at 800° F. of at least 85 ksi. Preferably, the valve seat insert exhibits a dimensional stability of less than about $0.5 \times 10^{-3}$ inches after 20 hours at 1200° F.

In another embodiment, a method of manufacturing an internal combustion engine such as a diesel engine comprises inserting the valve seat insert in a cylinder head of the engine. In operating an internal combustion engine such as a diesel engine, a valve is closed against the valve seat insert to close a cylinder of the engine and fuel is ignited in the cylinder to operate the engine.

DETAILED DESCRIPTION

A nickel-rich wear resistant alloy designed primarily for use in high temperature applications such as valve seat inserts and the like is disclosed herein. The alloy is a nickel rich multi-phase alloy metallurgically designed to achieve intermetallic strengthening within a eutectic reaction solidification substructure. Due to its unique strengthening mechanisms, the alloy has a relatively high compressive yield strength and toughness compared with commercially available nickel-based valve seat alloys, particularly at elevated temperature. The alloy also exhibits a relatively low thermal expansion coefficient which is an advantage for exhaust valve seat insert applications. The combination of high compressive strength at elevated temperature and low thermal expansion coefficient indicates that the alloy should have excellent insert retention capabilities for exhaust insert applications.

The alloy is preferably free of large primary carbides and coarse solidification substructures. The high temperature wear resistance and strength of the alloy is preferably achieved by its hard intermetallic phases and finely distributed solidification substructure. The alloy preferably includes a high chromium content and is preferably free of conventional MC type carbide alloying elements, such as niobium and tantalum. Further, by combining carbon, silicon, and chromium in accordance with preferred embodiments of the alloy hardness, strength, and wear resistance can be substantially improved while providing very desirable microstructures for valve seat insert applications. An additional advantage of the alloy is that solid-state phase transformation reactions preferably do not occur within a temperature range from 25-1000° C., thus, the alloy does not require heat treatment to achieve high hardness, strength, and thermal dimensional stability for elevated temperature applications.

The alloy can exhibit improved wear performance when run against conventional nickel-based valve materials such as Inconel 751 and Nimonic 80A as well as cobalt-based valve facing materials known as Stellite 1. Excellent wear performance of the alloy has been demonstrated in the Plint TE77 high temperature reciprocating wear test (ASTM Standard G133). The alloy outperforms other insert alloys such as cobalt-based J3 and nickel-based BX2 (representative of alloys in U.S. Pat. No. 6,200,688) as tested against Inconel 751 in both the intake and exhaust temperature ranges. The alloy also outperformed BX2 in wear tests with Nimonic 80A. Further, the alloy outperforms both cobalt-based J3 and iron-based J130 as tested against Stellite 1 within the exhaust temperature range.

Due to its unique alloy design concept, the alloy is significantly differentiated from any current commercially available nickel-based alloy, particularly for valve seat insert applications.

Figure 1:
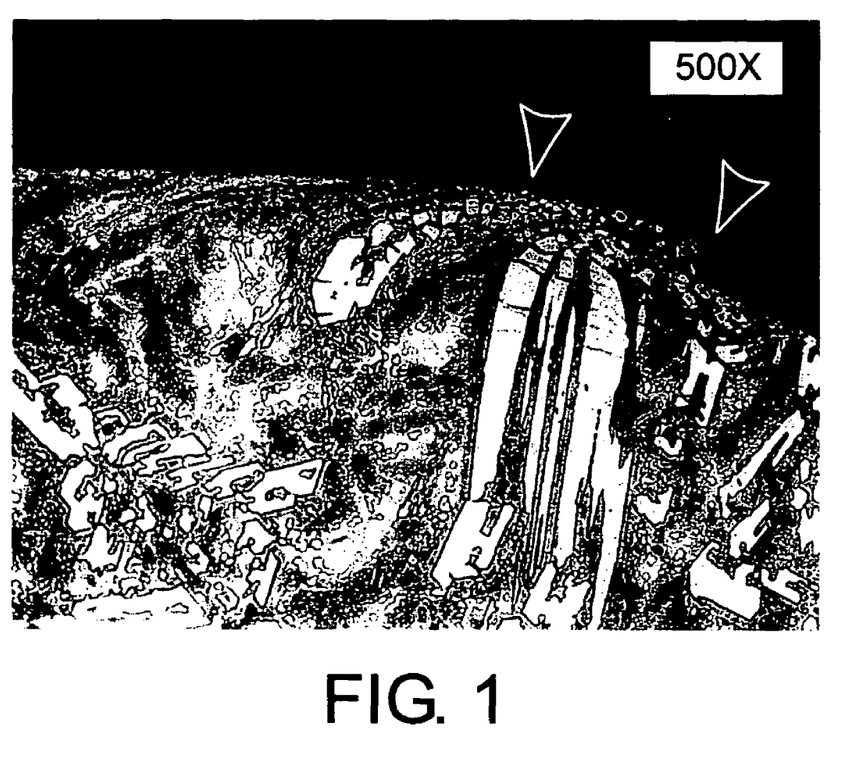
FIG. 1 illustrates J96 exhaust insert at seat I.D.

Historically, numerous high temperature strengthening mechanisms have been applied to a nickel matrix to make nickel-based superalloys among the most widely utilized metallic materials for elevated temperature applications. Desired material properties of nickel-based alloys include elevated temperature fatigue strength, creep strength, hot hardness, corrosion resistance, and oxidation resistance. Primary concerns for valve seat insert materials, such as J96 and J100 (ref. SAE Std. J1692), has been high insert outside diameter (O.D.) deformation and seat surface wear. Insert O.D. deformation leads to loss of interference fit potentially resulting in catastrophic engine failure due to insert drop-out. Insert drop out is primarily an exhaust valve seat insert issue and is caused by a combination of high insert operating temperature, high thermal expansion coefficient relative to cast iron, and low compressive yield strength at elevated temperature. Seat surface wear of J96 and J100 is primarily caused by a combination of low matrix strength and the fracturing of large rod-like primary carbides which occurs as the matrix deforms (see FIG. 1). In recent years, combustion pressure in diesel engines has been trending higher to meet goals of both engine performance and emissions reduction. This trend has been accompanied by an increased use of nickel-based valve materials, such as Inconel 751 and Nimonic 80A, to take advantage of their improved high temperature fatigue strength relative to iron-based valve materials. In some recent applications with nickel-based valves, higher wear rates of nickel-based insert materials have been observed. As such, there is an industry need for a new valve seat insert material which possesses higher strength and lower thermal expansion coefficient as well as a microstructure that improves wear performance compared to commercially available nickel-based valve seat inserts. To meet this combination of objectives, improvements to matrix strength and reduction of carbide size was investigated in developing a nickel-rich alloy referred to herein as the J73 alloy. The J73 alloy was designed to meet this need as well as the continuing need for improved wear performance with iron or cobalt-based valve or valve facing materials.

In a preferred embodiment, it is desired that the nickel-rich J73 alloy exhibits improvement in wear resistance and compressive strength for high performance engine applications which use nickel-based valve materials. According to a preferred embodiment, the nickel-rich wear resistant alloy comprises in weight % 0.5 to 2.5% C, 0.5 to 2% Si, up to 1% Mn, 20 to 30% Cr, 5 to 15% Mo, 5 to 15% W, 15 to 30% Fe, balance Ni. In an embodiment, C is 1.5 to 1.6%, Si is 1.0 to 1.1%, Cr is 20 to 25% and Ni is 25 to 50%. Preferably, Fe exceeds Cr by 0.5% to 5%, Ni exceeds Fe by 5 to 15% and W exceeds Mo by up to 2%. The alloy is a multi-component based (Ni—Cr—Fe—W—Mo) alloy system containing predominantly eutectic reaction phases, fine intermetallic phases, and precipitation carbides. Due to the nature of the eutectic reaction during the solidification process, the alloy can exhibit relatively good castability demonstrated by the following discussion of nine experimental heats. The composition of these nine heats of the alloy along with the as-cast bulk hardness is tabulated in Table 1.

This relationship between hardness and carbon content is unexpected. Notably, Trial 2 had lower silicon.

Trial 3 combines the higher carbon with higher silicon, but notably, chromium was low, again resulting in lower hardness.

Trial 4 tests the vanadium effect, at lower carbon and lower chromium. By comparing Trials 1, 2, & 4, it appears that vanadium is not a major alloying element that affects the bulk hardness.

Trial 5 is a repeat of Trial 1, and again, higher hardness was produced.

Trial 6 is a repeat of Trial 5 but without cobalt. Again, high hardness is produced which indicates cobalt is not a significant contributor to hardness.

Trial 7 is a repeat of Trial 6 except at higher carbon (1.90% C). High hardness is still produced; hence, the lower hardness of Trial 2 is related to more than carbon alone.

Trial 8 is a repeat of Trial 6 except at lower carbon (1.16% C). Now the higher hardness was lost. Given that chromium and silicon are higher than in Trial 2, this hardness loss is primarily a carbon effect.

Trial 9 is a repeat of higher carbon Trial 7 but with lower silicon (0.79% Si) and lower chromium (21.70% Cr). Again, the high hardness is not achieved.

The overall results of Table 2 show a previously unknown relationship between carbon, silicon, and chromium in achieving high hardness. It appears that approx. 1.0% min. silicon and 22% min. chromium are required to achieve hardness of 45-50 Rc. The experimentation indicates that both of these elements are preferred in these amounts to enable the alloy to achieve hardness of 45-50 Rc. The unique relationship of silicon, chromium and carbon provides an unexpected result, particularly the effect of chromium in producing high hardness. Given the lack of primary chromium carbide in the alloy, chromium appears to be participating in eutectic reactions resulting in the formation of chromium, nickel and tungsten rich intermetallic phases.

Regarding microstructure, the alloy preferably consists of a very uniform lamellar type of eutectic solidification struc-

TABLE 1

Summary of Nine Experimental Heats

| Trial | Heat# | C | Mn | Si | Cr | Mo | W | Co | Fe | Ni | V | HRc |
|---|---|---|---|---|---|---|---|---|---|---|---|---|
| 1 | 3E28XA | 1.57 | 0.08 | 1.00 | 22.41 | 8.66 | 10.56 | 0.48 | 23.15 | 31.94 | <0.1 | 49.0 |
| 2 | 3E30XA | 1.99 | 0.08 | 0.77 | 21.87 | 8.49 | 10.27 | 0.22 | 24.39 | 30.61 | 1.20 | 40.0 |
| 3 | 3F04XA | 1.86 | 0.07 | 0.92 | 20.79 | 8.90 | 10.20 | <0.1 | 24.50 | 32.56 | <0.1 | 40.0 |
| 4 | 3F16XA | 1.55 | 0.09 | 0.86 | 20.14 | 8.75 | 10.46 | <0.1 | 25.52 | 31.36 | 1.15 | 42.0 |
| 5 | 3F20XA | 1.57 | 0.07 | 1.01 | 22.46 | 8.58 | 10.50 | 0.44 | 23.09 | 32.13 | <0.1 | 47.5 |
| 6 | 3G01XA | 1.61 | 0.08 | 0.91 | 22.56 | 8.68 | 10.65 | <0.1 | 23.34 | 32.00 | <0.1 | 47.0 |
| 7 | 3G08XA | 1.90 | 0.08 | 0.97 | 22.69 | 8.56 | 10.50 | <0.1 | 23.51 | 31.64 | <0.1 | 48.0 |
| 8 | 3G10XA | 1.16 | 0.07 | 0.90 | 22.26 | 8.65 | 10.55 | <0.1 | 23.60 | 32.62 | <0.1 | 41.0 |
| 9 | 3G17XA | 1.88 | 0.07 | 0.79 | 21.70 | 8.93 | 9.74 | <0.1 | 24.69 | 32.03 | <0.1 | 40.0 |

In nickel-based valve seat insert alloys containing high chromium, the bulk hardness of the material may increase with an increasing carbon content due to the existence of increasing amounts of primary carbide in the alloy. However, for a multiple component nickel rich alloy, the influence of carbon on the bulk hardness is believed to involve not only chromium, but silicon as well. Comments relating to these experimental heats follow:

Trial 1 (Heat 3E28XA) showed the highest bulk hardness although its carbon content was much lower than heat 3E30XA (Trial 2) which had a relatively low bulk hardness.

tures. Within the alloy system, primary dendritic carbides are not observed at carbon levels of 1.8. % C or less. Non-dendritic type primary carbides can be observed when carbon content is greater than 1.8 wt. %. When carbon content is less than 1.5 wt. %, the alloy is comprised of solid solution phase "islands" encompassed by eutectic reaction products. Vanadium is an MC type carbide former in the alloy system, however, it was found that its effect on bulk hardness of the alloy was relatively small within a range of 0-1.5 wt. %, hence, vanadium inclusion in the alloy system is optional. Cobalt behaves similarly to vanadium and can optionally be included in the alloy in amounts of 0-1.5 wt. %.

Compressive Yield Strength

The compressive yield strength of a material reflects bulk resistance to permanent deformation. This is a very desired property for a valve seat insert during engine operation because it affects both the ability to retain interference fit and to resist seat surface deformation and resulting wear. The compressive yield strength as a function of temperature for the alloy and other conventional nickel-based alloys can be illustrated in Table 3.

TABLE 3

Compressive Yield Strength (CYS) for Some Nickel-based/Nickel Rich Alloys.

| Alloys | CYS @ RT (KSI) | CYS @ 600° F. (KSI) | CYS @ 800° F. (KSI) | CYS @ 1000° F. (KSI) |
|---|---|---|---|---|
| J89 | 130 | 115 | 112 | 115 |
| J96 | 67 | 67 | 63 | 67 |
| J100 | 63 | 60 | 57 | 62 |
| J73 (3E28XA) | 98 | 95 | 86 | 89 |

The J89, J96 and J100 alloys referred to in Table 3 include the following alloy compositions: J89 has 2.440% C, 0.298% Mn, 0.525% Si, 34.73% Cr, 15.21% W, 4.580% Mo, 0.090% Fe, 0.050% Co, 35.93% Ni and 0.146% incidental impurities, J96 has 2.510% C, 0.253% Mn, 0.700% Si, 28.26% Cr, 15.34% W, 0.063% Mo, 6.050% Fe, 0.920% Co, 45.64% Ni and 0.264% incidental impurities, and J100 has 2.238% C, 0.338% Mn, 0.716% Si, 27.61% Cr, 15.41% W, 0.027% Mo, 5.540% Fe, 9.735% Co, 38.35% Ni and 0.034% incidental impurities.

It can be seen that two of the tested materials, J96 and J100, have significantly lower compressive strength than the J73 alloy, particularly at elevated temperature. This is one of the primary nickel-based material deficiencies that the J73 alloy sought to improve upon. The data show that the J73 alloy has provided a 30-40% improvement in compressive strength at elevated temperatures. J89 is a nickel-based alloy intended to improve strength and wear resistance relative to J96 and J100; however, it utilizes a very different elemental approach than the J73 alloy. Though the strength increase of the J73 alloy relative to J96 and J100 is less than was achieved with J89, the major advantage of the J73 alloy relative to J89 is improved machinability.

One additional point of interest for the J73 alloy is the slight strengthening which occurs at 1000° F. This is also observable in alloys J89 and J96, but not J100. It is likely that a secondary precipitation strengthening takes place at 1000° F. in these alloys which is a desirable feature for nickel rich valve seat insert alloys to help protect against strength loss at extreme temperature. The secondary precipitation effect is somewhat more pronounced in J96 because it contains a significant amount of a free nickel solid solution phase (FCC).

Six additional heats of the alloy (Trials 10-15) were made using a sixty-pound furnace to further explore the influence of carbon and silicon on the castability and bulk hardness of the alloy. One design criteria was to create a lower hardness version of the alloy with improved microstructural characteristics. An advantage of lower insert hardness in certain valve train applications is that it will tend to minimize valve wear, possibly at the expense of increased insert wear; however, the combined wear would be less. As such, for wear problems where valve wear is a high percentage of the total wear, a softer version of the insert alloy would be desirable.

For trials 10-15, the iron content was about 20 wt. % and the nickel content was about 34 wt. %. One stack of insert castings was made with each of the six experimental heats. Trials 10-12 tested different carbon contents whereas Trials 13-15 tested different silicon contents at a 1.1% carbon target. Table 4 summarizes the composition and as-cast hardness results for these experimental heats.

TABLE 4

Summary of Six Additional Experimental Heats

| Trial | Heat # | C | Mn | Si | Cr | Mo | W | Co | Fe | Ni | V | HRc |
|---|---|---|---|---|---|---|---|---|---|---|---|---|
| 10 | 4I17XA | 0.49 | 0.09 | 1.12 | 23.08 | 9.05 | 11.07 | <0.1 | 21.13 | 33.75 | <0.1 | 34.3 |
| 11 | 4K17XA | 0.78 | 0.07 | 1.06 | 24.12 | 9.02 | 10.72 | <0.1 | 20.16 | 33.84 | <0.1 | 36.4 |
| 12 | 4K17XB | 1.48 | 0.07 | 1.06 | 24.16 | 8.99 | 10.62 | <0.1 | 19.91 | 33.48 | <0.1 | 49.8 |
| 13 | 4K18XA | 1.09 | 0.06 | 0.80 | 24.30 | 9.13 | 10.68 | <0.1 | 19.85 | 33.85 | <0.1 | 42.6 |
| 14 | 4K18XB | 1.08 | 0.07 | 1.52 | 23.95 | 9.16 | 10.60 | <0.1 | 19.44 | 33.75 | <0.1 | 44.0 |
| 15 | 4K19XA | 1.01 | 0.06 | 0.53 | 24.19 | 9.20 | 10.74 | <0.1 | 19.92 | 34.11 | <0.1 | 40.5 |

Pouring temperature of all heats was between 2870-2920° F. All insert castings filled completely except for Trial 15 (Heat 4K19XA) which experienced incomplete fill in the top mold. The incomplete fill was primarily caused by the significantly low silicon content of 0.53%., therefore, for cast parts, at least 0.5% silicon is believed to be desirable for improving castability. Further, a metallographic examination of heat 4K19XA showed the existence of bulk shrinkage at the center of the insert cross-section though it was relatively small in size. Comments regarding these trials are as follows:

Trails 10 and 11 shows that at carbon levels of 0.5% and 0.8%, bulk hardness drops to the mid-30's Rc even with target levels of silicon and chromium. This hardness is likely too low to be useful for cast valve seat insert applications.

Trial 12 demonstrated high hardness again, this time with lower iron and higher nickel than present in the heats for Trials 1-9. There was also no vanadium or cobalt in this heat.

Trials 13-15 show that with carbon content at about 1.1 wt. %, hardness moved up to the low 40's Rc. The combination of 1.1% carbon with high silicon of 1.5% (Trial 14) produced an increase in hardness to 44 Rc; however, higher hardness is preferably achieved by reversing these percentages (i.e. 1.5% C, 1.1% Si.) as demonstrated in Trial 12 which exhibited a hardness of about 50 Rc.

The overall results of Trials 10-15 confirm earlier findings regarding a balance between carbon, silicon, and chromium to produce desired hardness. Silicon clearly plays a role in determining final hardness, but reaching the high 40's HRc is not possible with silicon alone. It appears that carbon and silicon contents must also be controlled to achieve the desired high hardness. Silicon is of lesser concern if a low 40's HRc version of the alloy is desired. Trial 12 represents a preferred combination of carbon, silicon, and chromium, approx. 1.5-1.6% C, 1.0-1.1% Si, and 23-25% Cr, to produce the highest hardness in this alloy system.

Relationship of Bulk Hardness and Alloying Elements

The elemental chemistry of all 15 experimental heats (Tables 2 & 4) of the alloy were used to carry out a multiple linear regression study to determine the relative mathematical strength of the various alloying elements on the bulk hardness. The results of the linear regression study is presented in Equation 1:

$$\text{Bulk HRc} = -1.6 + 7.89C - 0.71Si + 1.49Cr + 9.97Co - 3.15V \quad (1)$$

When studying the relative effects of the various elements on Bulk HRc, the relative effect of each element is the product of the coefficient and the elemental % content. As such, the primary drivers of hardness effect in equation (1) are carbon and chromium. Though chromium has a lower positive coefficient, it's content is much higher making its overall contribution to the equation significant.

Figure 2:
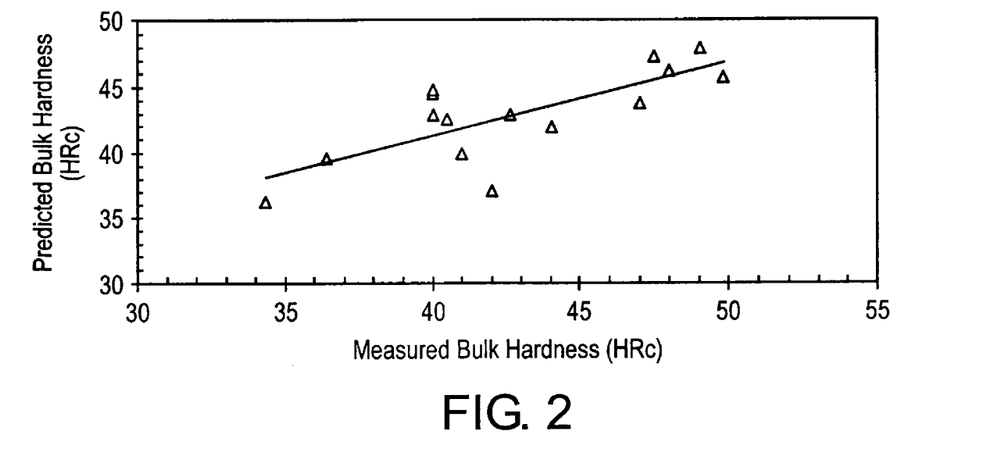
FIG. 2 illustrates correlation between measured and predicted bulk hardness in J73 alloy system.

FIG. 2 shows the correlation between measured and calculated bulk hardness using Equation 1. A reasonable trend was achieved although only fifteen experimental heats were available for this study.

Thermal Expansion Coefficient

J73 Heat 3E28XA (Trial 1) was used for determining the thermal expansion coefficient. A comparison of thermal expansion coefficient for materials including the J73 alloy, J89, J96, J100, J3, and J130 are summarized in Table 5. Cobalt-based J3 and iron-based J130 are included for comparative purposes. All the thermal expansion coefficient tests were conducted using 1 inch long and 0.5 inch in diameter cylindrical specimens.

The most desirable thermal expansion coefficient for heavy duty valve seat insert applications is one that matches the cylinder head cast iron, typically about $11.5 \times 10^{-6}$ mm/mm° C. Cobalt-based alloys and nickel-based alloys often possess a relatively high thermal expansion coefficient and the relatively low thermal expansion coefficient of the J73 alloy is an advantage and is attributable to the alloy system design.

Another significant result from the thermal expansion testing was that the expansion curve was found to be smooth and gradually increasing throughout the temperature range from 25-1000° C. This indicates that no phase transformations occurred throughout this temperature range and confirms that heat treatment is not necessary to achieve thermal dimensional stability.

Production Heats and SEM/EDS Examination

Based upon study of the fifteen experimental pours, two full size production heats (750 lbs.) of the J73 alloy, Heats 4G28I (Trial 16) and 4G30K (Trial 17) were made for production validation of softer and harder versions of the alloy material. Trial 16 was targeted to be softer (low 40's Rc) and Trial 17 targeted to be harder (mid-40's Rc). Preliminary investigations reveal that the J73 alloy microstructure is generally more desirable at lower carbon content; hence, a preferred valve seat material would limit carbon to no more than is absolutely necessary to achieve the desired hardness. Chemistry and hardness results for Trials 16 and 17 are below in Table 6:

TABLE 5

Thermal Expansion Coefficient ($\times 10^{-6}$ mm/mm ° C.)

| | Alloy | | | | | |
|---|---|---|---|---|---|---|
| | J73 | J89 | J96 | J100 | J3 | J130 |
| Alloy System | Nickel Rich | Nickel Rich | Nickel-Base | Nickel Base | Cobalt-based | Iron-based |
| 25–200° C. | 11.40 | 10.73 | 12.21 | 12.84 | 13.09 | 10.47 |
| 25–300° C. | 12.14 | 11.25 | 12.98 | 13.75 | 13.96 | 11.32 |
| 25–400° C. | 12.55 | 11.58 | 13.42 | 14.33 | 14.54 | 12.00 |
| 25–500° C. | 12.94 | 11.89 | 13.75 | 14.72 | 15.01 | 12.34 |
| 25–600° C. | 13.34 | 12.23 | 14.23 | 15.18 | 15.26 | 12.55 |

Table 5 shows that the J73 alloy possesses a relatively low thermal expansion coefficient compared with J96 and J100.

TABLE 6

Composition of 750-pound Heats 4G28I (Trial 16) and 4G30K (Trial 17)

| Trial | Heat # | C | Mn | Si | Cr | Mo | W | Co | Fe | Ni | V | HRc |
|---|---|---|---|---|---|---|---|---|---|---|---|---|
| 16 | 4G28I | 1.17 | 0.09 | 1.00 | 23.67 | 9.00 | 11.02 | <0.1 | 19.97 | 33.86 | <0.1 | 41.8 |
| 17 | 4G30K | 1.34 | 0.10 | 1.14 | 24.26 | 9.18 | 10.12 | 0.34 | 20.53 | 32.82 | <0.1 | 46.0 |

In studying the microstructure of heat 4G28I, it was found to be similar to the desirable results observed in 3G10XA (Trial 8, a lower carbon heat). As such, heat 4G28I was utilized to carry out SEM/EDS examination of the alloy material. It was revealed that the distribution of non-eutectic reaction phase (likely a solid solution phase) was evenly distributed.

An SEM/EDS/WDS assisted phase characterization was carried out using a model of Hitachi S3600N scanning electron microscope. Based upon the information from the microstructural examination some initial conclusions could be reached. A typical SEM microstructural image of the alloy (4G28I) at 2000× magnification is depicted in FIG. 3.

Figure 3:
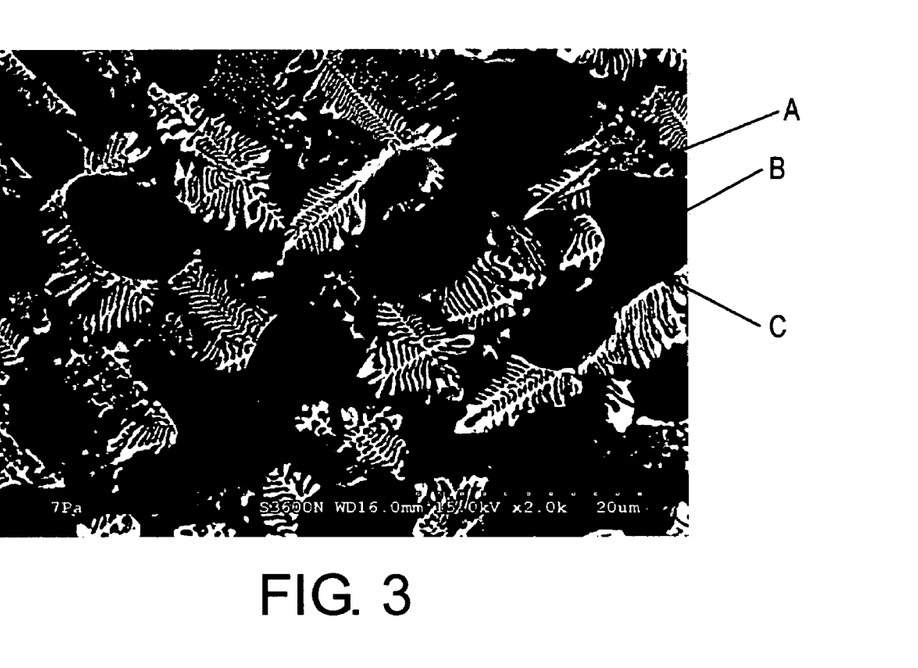
FIG. 3 illustrates a secondary electron SEM morphology in J73 (4G28I) casting (2000×).

Three major matrix phases could be viewed in an SEM secondary electron image (FIG. 3). The image was adjusted to show the three major phases by level of brightness (A=white, B=gray, and C=black) in FIG. 3. It was evident that Phase B was the abundant solid solution matrix phase. The Phase B distributed in and between regions A and C which are multi-phase eutectic reaction products resulting from eutectic/peritectic reactions while the "island-like" portions of Phase B is likely a primary phase during the alloy casting solidification process.

Figure 4:
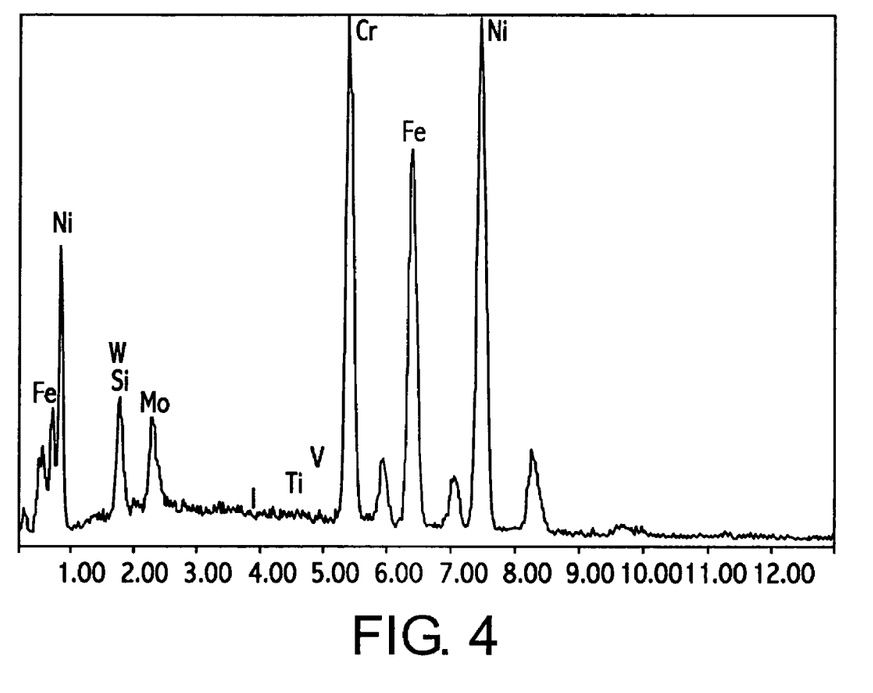
FIG. 4 illustrates an EDS spectrum showing typical composition for phase A in FIG. 3.

The three phases observed in the alloy appear to be very consistent in composition. Phase A has the highest chromium and least tungsten content while Phase C has the highest tungsten and least chromium content among the three phases examined. The EDS result for the chromium rich Phase A is shown in FIG. 4.

To further verify that phase transformations were not occurring below 1200° F., two heats of the alloy were tested for dimensional stability. Two 5 piece groups of inserts were tested from each heat. One 5 piece group was as-cast (no heat treatment) while the other 5 piece group was heat treated (stress relieved) at 1450° F. for 4.5 hrs.

To conduct a dimensional stability test, the outside diameters (O.D.) of all inserts are measured very accurately at two locations, 90° apart. They are then heated at 1200° F. for 20 hrs. followed by cooling in still air. The inserts are then cleaned and O.D.'s re-measured at the same locations as the initial measurements. The difference between the initial and final O.D. sizes are then calculated. An insert material is considered dimensionally stable if O.D. size change is less than 0.00025" per 1" of insert diameter. The insert diameter tested was 1.375" which allows for a maximum change of 0.00034" after heating to be considered dimensionally stable. Dimensional stability test results are as follows in Table 7:

TABLE 7

Dimensional Stability Results

| Heat No. | Heat Treatment | Hardness HRc | Avg. O.D. Size Change After 1200° F., 20 hrs. | Max. Change Allowable | Status |
|---|---|---|---|---|---|
| 4G28I | None | 41.8 | 0.00005" | 0.00034" | Pass |
| 4G28I | 1450° F., 4.5 hrs. | 43.1 | 0.00006" | 0.00034" | Pass |
| 4G30K | None | 46.0 | 0.00005" | 0.00034" | Pass |
| 4G30K | 1450° F., 4.5 hrs. | 46.3 | 0.00002" | 0.00034" | Pass |

Both groups of insert from both heats were very stable and well below the allowable O.D. size change. As such, it was concluded that no significant dimensional changes occur at 1200° F. or below regardless of whether the alloy was heat treated or not.

Plint Wear Test Results

High temperature reciprocating wear tests in a Plint Model TE77 Tribometer were carried out using reciprocating pin versus plate test. The testing condition included a 20 Newton applied load, a 20 hertz reciprocating frequency and a 1 mm stroke length at various test temperatures from ambient to 500° C.

In the wear tests, the reciprocating pin is made of the insert material while the stationary plate is made of the valve material. Valve materials tested include nickel-based Inconel 751, nickel-based Nimonic 80A, and cobalt-based Stellite 1. Insert materials tested include three heats of the J73 alloy (Heats 3E28XA, 3F20XA, and 3G01XA), as well as one heat of nickel-based material BX2 (Heat 3I10XA), one heat of J3 (Heat 4C30A), and one heat of J130 (Heat 4D14N) for comparative purposes. Cobalt-based J3 is currently one of the most successful materials to run with nickel-based and Stellite 1 valve materials in the marketplace today. Iron-based J130 is also currently successful in exhaust applications. BX2 is a nickel-based material representative of alloys disclosed in U.S. Pat. No. 6,200,688. The composition of materials used for the wear testing is compiled in Table 8.

TABLE 8

Chemical Composition of Insert Materials Used for Plint Wear Tests.

| Alloy | Heat No. | C | Mn | Si | Cr | Mo | W | Co | Fe | Ni | V | Nb |
|---|---|---|---|---|---|---|---|---|---|---|---|---|
| J73 | 3E28XA | 1.57 | 0.08 | 1.00 | 22.41 | 8.66 | 10.56 | 0.48 | 23.15 | Bal. | <0.1 | — |
| J73 | 3F20XA | 1.57 | 0.07 | 1.01 | 22.46 | 8.58 | 10.50 | 0.44 | 23.09 | Bal. | <0.1 | — |
| J73 | 3G01XA | 1.61 | 0.08 | 0.91 | 22.56 | 8.68 | 10.65 | <0.1 | 23.34 | Bal. | <0.1 | — |
| J3 | 4C30A | 2.29 | 0.22 | 0.75 | 29.97 | — | 11.95 | Bal. | 0.74 | 0.22 | — | — |
| BX2 | 3I10XA | 1.60 | 0.46 | 3.70 | 13.43 | — | 11.93 | — | 33.09 | Bal. | — | — |
| J130 | 4D14N | 1.48 | 0.40 | 0.98 | 10.00 | 9.24 | — | — | Bal. | 0.99 | 1.32 | 1.97 |

The wear testing results are summarized in Tables 9 and 10. Tests are carried out within both the intake and exhaust insert temperature ranges with results organized accordingly. Some conclusions derived from the testing results can be summarized as follows:

TABLE 9

Summary of Plint Wear Testing Results, Intake Temperature Range

| Test | | Pin/Plate Materials | Avg. Total Wear (mg) | Avg. Plate Wear (mg) | Avg. Pin Wear (mg) | Plate Wear Percent (%) |
|---|---|---|---|---|---|---|
| Intake Temperature Range of 200–300° C. | 1 | J73 (3F20XA)/Inconel 751 | 1.93 | 1.67 | 0.27 | 86 |
| | 2 | BX2 (3I10XA)/Inconel 751 | 4.83 | 1.87 | 2.97 | 39 |
| | 3 | J3 (4C30A)/Inconel 751 | 3.20 | 0.83 | 2.37 | 26 |
| | 4 | J73 (3E28XA)/Stellite 1 | 3.93 | 3.77 | 0.17 | 96 |
| | 5 | J73 (3F20XA)/Stellite 1 | 3.80 | 3.63 | 0.17 | 96 |
| | 6 | J73 (3G01XA)/Stellite 1 | 3.40 | 3.20 | 0.20 | 94 |
| | 7 | J73 (3F20XA)/Nimonic 80A | 3.60 | 2.37 | 1.23 | 66 |
| | 8 | BX2 (3I20XA)/Nimonic 80A | 5.20 | 1.90 | 3.30 | 37 |
| | 4 | J73 (3E28XA)/Stellite 1 | 3.93 | 3.77 | 0.17 | 96 |
| | 9 | J3 (4C30XA)/Stellite 1 | 4.27 | 3.23 | 1.03 | 76 |
| | 10 | J130 (4D14N)/Stellite 1 | 4.23 | 4.17 | 0.17 | 96 |

TABLE 10

Summary of Plint Wear Testing Results, Exhaust Temperature Range

| Test | | Pin/Plate Materials | Avg. Total Wear (mg) | Avg. Plate Wear (mg) | Avg. Pin Wear (mg) | Plate Wear Percent (%) |
|---|---|---|---|---|---|---|
| Exhaust Temperature Range of 350 to 450° C. | 1 | J73 (3F20XA)/Inconel 751 | 1.73 | 1.73 | 0.00 | 100 |
| | 2 | BX2 (3I10XA)/Inconel 751 | 3.90 | 2.43 | 1.47 | 62 |
| | 3 | J3 (4C30A)/Inconel 751 | 2.87 | 2.60 | 0.27 | 91 |
| | 4 | J73 (3E28XA)/Stellite 1 | 2.34 | 2.27 | 0.17 | 93 |
| | 5 | J73 (3F20XA)/Stellite 1 | 4.57 | 4.53 | 0.03 | 99 |
| | 6 | J73 (3G01XA)/Stellite 1 | 6.00 | 5.77 | 0.23 | 96 |
| | 7 | J73 (3F20XA)/Nimonic 80A | 1.80 | 1.63 | 0.17 | 91 |
| | 8 | BX2 (3I20XA)/Nimonic 80A | 2.20 | 1.17 | 1.03 | 53 |
| | 4 | J73 (3E28XA)/Stellite 1 | 2.43 | 2.27 | 0.17 | 93 |
| | 9 | J3 (4C30XA)/Stellite 1 | 6.13 | 5.53 | 0.60 | 90 |
| | 10 | J130 (4D14N)/Stellite 1 | 4.77 | 4.57 | 0.20 | 96 |

Conclusions based upon wear test results are as follows:

The J73 alloy exhibits a better wear performance than J3 and BX2 when tested against nickel-based valve material Inconel 751. This enhancement in wear resistance occurred within both the intake and exhaust temperature ranges.

The wear resistance of the J73 alloy against Stellite 1 within the exhaust temperature range appears to be improved with an increase in bulk hardness. Heat 3E28XA (Test 4) had the lowest total and pin wear in Plint tests.

The J73 alloy outperforms BX2 when run against nickel-based valve material Nimonic 80A. BX2 shows significantly higher pin wear as well as total wear within both the intake and exhaust temperature ranges.

The J73 alloy outperforms both J3 and J130 when tested against cobalt-based valve facing materials Stellite 1 within the exhaust insert temperature range. Significantly, the exhaust application is where Stellite 1 is most commonly used in today's marketplace.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A nickel-rich wear resistant alloy comprising in weight %:
   0.5 to 1.5% C
   0.5 to 1.5% Si
   up to 1% Mn
   20 to 30% Cr
   5 to 15% Mo
   5 to 15% W
   15 to 30% Fe
   balance Ni
   the alloy having a microstructure containing uniform lamellar type eutectic solidification structures and the Ni content exceeding the Fe content by at least 5%, and the microstructure containing predominantly eutectic reaction phases, fine intermetallic phases and precipitation carbides.

2. The alloy of claim 1, further comprising up to 1.5% each of Ti, Al, Zr, Hf, Ta, V, Nb, Co or Cu and/or up to 0.5% each of Mg, B or Y.

3. The alloy of claim 1, wherein Si is 1.0 to 1.1% and Cr is 20-25%.

4. The alloy of claim 1, wherein C is 1 to 1.5%, Si is 0.75 to 1.5%, Cr is 22 to 25%, Mo is 7 to 12%, W is 7 to 12%, Fe is 22 to 25% and Ni is 25 to 40%.

5. A nickel-rich wear resistant alloy comprising in weight %:
   0.5 to 1.5% C
   0.5 to 1.5% Si
   up to 1% Mn
   20 to 30% Cr
   5 to 15% Mo 5 to 15% W
15 to 30% Fe
balance Ni
the alloy having a microstructure containing uniform lamellar type eutectic solidification structures and the Ni content exceeding the Fe content by at least 5%, and the microstructure containing Cr, Ni, W rich intermetallic phases.

6. A nickel-rich wear resistant alloy comprising in weight %:
0.5 to 1.5% C
0.5 to 1.5% Si
up to 1% Mn
20 to 30% Cr
5 to 15% Mo
5 to 15% W
15 to 30% Fe
balance Ni
the alloy having a microstructure containing uniform lamellar type eutectic solidification structures and the Ni content exceeding the Fe content by at least 5%, and the microstructure containing essentially no primary dendritic carbides.

7. A nickel-rich wear resistant alloy comprising in weight %:
0.5 to 1.5% C
0.5 to 1.5% Si
up to 1% Mn
20 to 30% Cr
5 to 15% Mo
5 to 15% W
15 to 30% Fe
balance Ni
the alloy having a microstructure containing uniform lamellar type eutectic solidification structures and the Ni content exceeding the Fe content by at least 5%, and the microstructure containing solid solution phases encompassed by eutectic reaction products.

8. A valve seat insert comprising in weight %:
0.5 to 1.5% C
0.5 to 1.5% Si
up to 1% Mn
20 to 30% Cr
5 to 15% Mo
5 to 15% W
15 to 30% Fe
balance Ni,
the alloy having a microstructure containing uniform lamellar type eutectic solidification structures and the Ni content exceeding the Fe content by at least 5% and the microstructure containing predominantly eutectic reaction phases, fine intermetallic phases and precipitation carbides.

9. The valve seat insert of claim 8, further comprising up to 1.5% each of Ti, Al, Zr, Hf, Ta, V, Nb, Co or Cu, up to 0.5% B and/or up to 0.5% Mg plus Y.

10. The valve seat insert of claim 8, wherein Si is 1.0 to 1.1% and Cr is 20-25%.

11. The valve seat insert of claim 8, wherein the Fe content exceeds the Cr content by at least 0.5%.

12. The valve seat insert of claim 8, wherein the W content exceeds the Mo content.

13. The valve seat insert of claim 8, wherein the W content exceeds the Mo content by no more than 2%, the Fe content exceeds the Cr content by no more than 5% and the Ni content exceeds the Fe content by no more than 15%.

14. The valve seat insert of claim 8, wherein the insert is a cast insert.

15. The valve seat insert of claim 8, wherein the insert has an as cast hardness of at least about 40 Rockwell C, a compressive yield strength at room temperature of 95 ksi and/or a compressive yield strength at 800° F. of at least 85 ksi.

16. The valve seat insert of claim 8, wherein the insert exhibits a dimensional stability of less than about $0.5 \times 10^{-3}$ inches after 20 hours at 1200° F.

* * * * *